June 1, 1937.   R. TYLER   2,082,473
HYDRAULIC TRANSMISSION
Filed Sept. 9, 1933   2 Sheets-Sheet 1
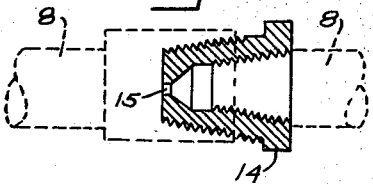
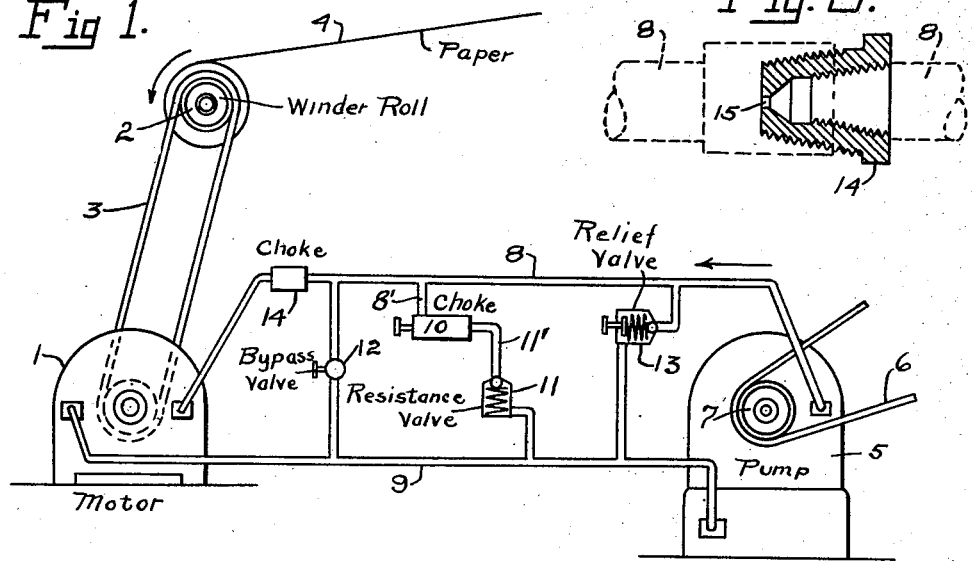
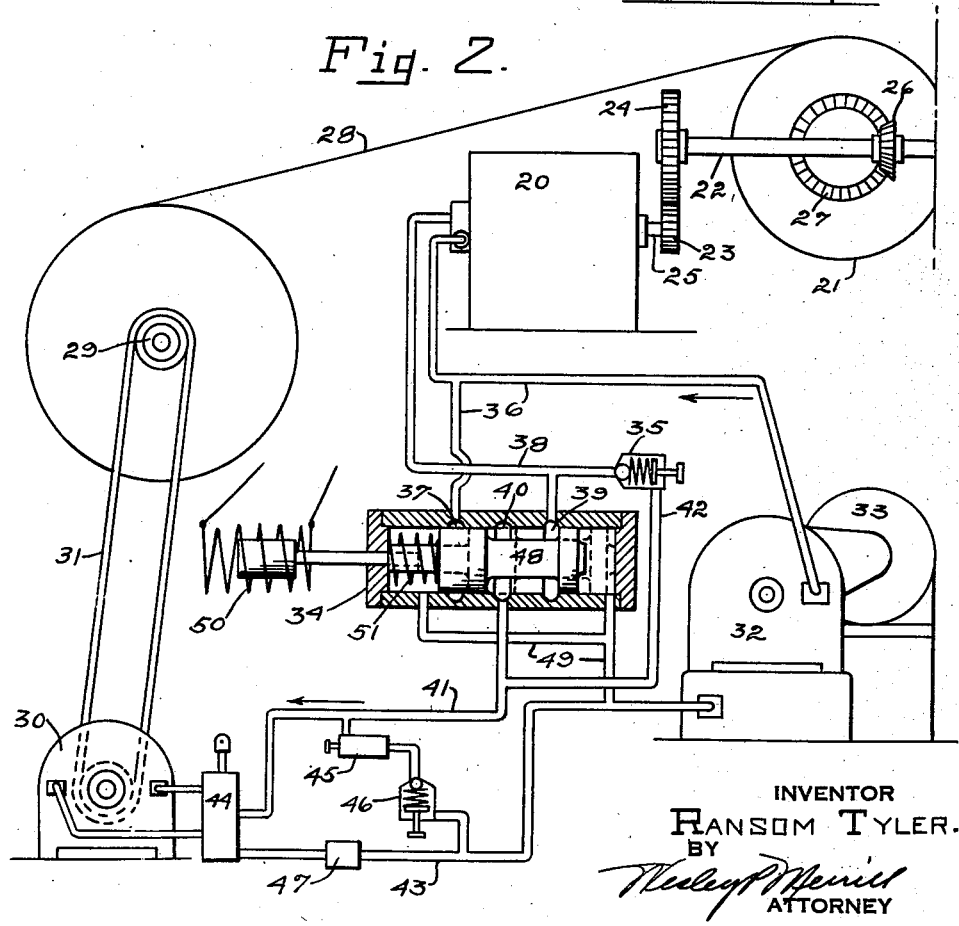
INVENTOR
RANSOM TYLER.
BY
ATTORNEY June 1, 1937.  R. TYLER  2,082,473
HYDRAULIC TRANSMISSION
Filed Sept. 9, 1933  2 Sheets-Sheet 2
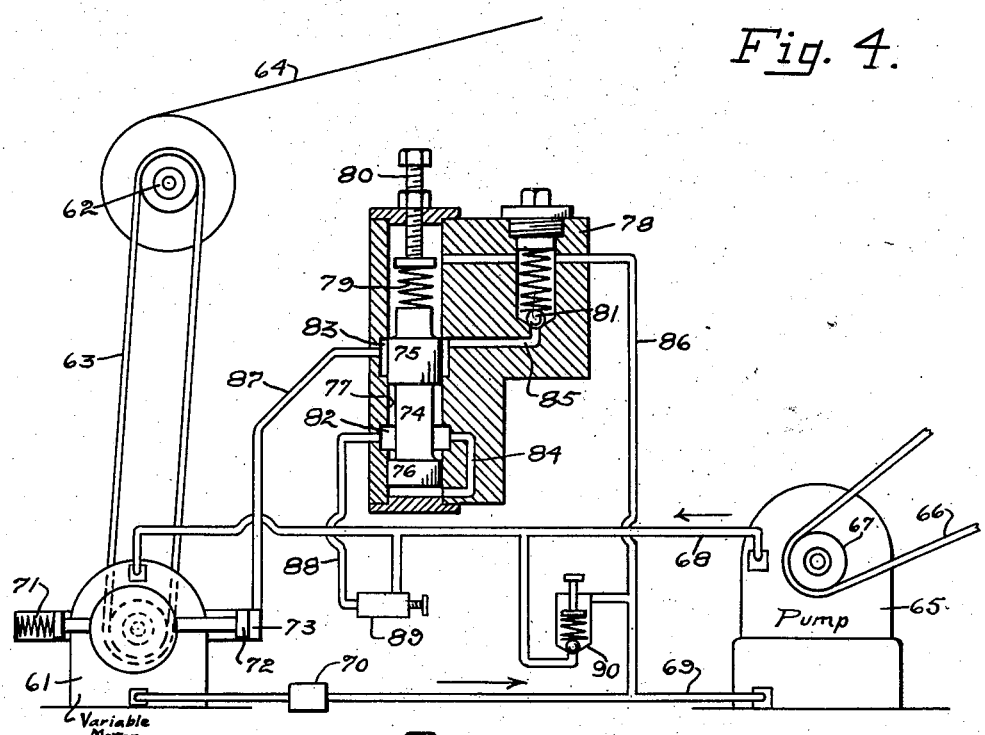
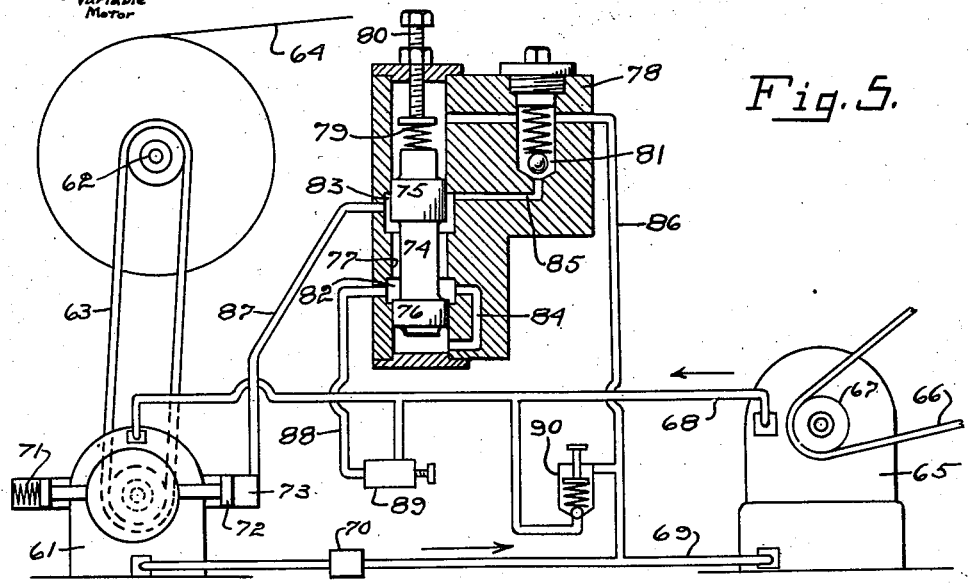
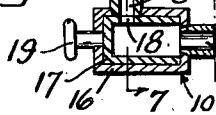
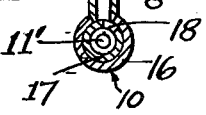
INVENTOR
RANSOM TYLER.
BY
ATTORNEY Patented June 1, 1937

2,082,473

UNITED STATES PATENT OFFICE 2,082,473

HYDRAULIC TRANSMISSION

Ransom Tyler, Wauwatosa, Wis., assignor to The Oilgear Company, Milwaukee, Wis., a corporation of Wisconsin Application September 9, 1933, Serial No. 688,725

20 Claims. (Cl. 60—53)

This invention relates to a hydraulic transmission of the type in which a rotary hydraulic motor is driven by liquid supplied thereto from a pump.

The transmission to which the invention applies is particularly adapted for driving a roll upon which flexible material is to be wound under a substantially uniform tension, such as the winder roll of certain types of printing presses, paper mills and the like.

For example, a certain type of printing press delivers printed paper in long or substantially continuous strips to a winder roll which should wind it thereon as received and maintain a substantially uniform tension upon the paper irrespective of the speed at which it is delivered by the printing press.

Under ordinary operating conditions, the paper is delivered to the winder roll at a substantially uniform speed but, since the diameter of the roll of paper upon the winder roll increases as the paper is wound thereon, the winder roll must be driven at a relatively high speed when the diameter is small and the speed of the roll decreased and the torque increased as the diameter increases in order to maintain a uniform tension upon the paper.

The present invention has as an object to provide a hydraulic transmission which is particularly adapted for driving the winder roll of a printing press or the like.

Another object is to provide a printing press with a hydraulic transmission for driving it and its winder roll.

Another object is to provide a printing press with a hydraulic transmission which will drive it and its winder roll and will function as a brake to decelerate the press.

Another object is to provide a hydraulic transmission having a substantially constant power output at varying motor speeds.

Another object is to provide a hydraulic transmission in which the motor will automatically vary its speed to maintain its power output substantially constant.

Other objects and advantages will be apparent from the description hereinafter given of illustrative embodiments of the invention.

According to the invention in its general aspect and as ordinarily embodied in practice, the transmission is provided with a rotary hydraulic motor for connection to the mechanism to be driven, a pump for supplying liquid to the motor, means for bypassing or diverting a part of the liquid delivered by the pump and responsive to variations in pump pressure for varying the volume of bypassed or diverted liquid, and means responsive to variations in the velocity of the liquid for varying the pressure drop across the motor to thereby vary the torque of the motor and for varying pump pressure to cause a variation in the volume of bypassed or diverted liquid and thereby cause a variation in motor speed.

According to the invention in another aspect, the transmission is provided with two motors which are connected in series, a pump for supplying liquid to the motors one of which drives a printing press or other machine and the other of which drives the winder roll thereof, and a valve for diverting liquid discharged from one motor through a resistance valve which functions as a brake to decelerate the press or other machine.

According to the invention in another aspect, the transmission is provided with a variable displacement rotary motor for connection to the mechanism to be driven, a pump for delivering motive liquid to the motor to drive the same, and means for varying the stroke of the motor in response to variations in pump pressure to thereby vary the speed of the motor through a given speed range and to vary the torque of the motor inversely to the motor speed.

The invention is exemplified by the transmissions shown schematically in the accompanying drawings in which the views are as follows:

Fig. 1 is a schematic drawing showing the invention applied to the winder roll of a printing press.

Fig. 2 is a schematic drawing showing the invention applied to a printing press and the winder roll thereof.

Fig. 3 is a longitudinal section through a choke which may be employed in the transmissions.

Fig. 4 is a schematic drawing showing another form of the invention applied to the winder roll of a printing press, the parts being in the positions occupied when the winder roll is being operated at high speed.

Fig. 5 is a view similar to Fig. 4 but showing the parts in the positions occupied when the winder roll is being operated at a slower speed.

Fig. 6 is a longitudinal central section through a choke of the type which may be employed for diverting from the motor a part of the liquid discharged by the pump.

Fig. 7 is a section taken on the line 7—7 of Fig. 6.

*Fig. 1.*—The transmission shown in this figure is provided with a constant displacement rotary hydraulic motor 1 which drives a winder roll 2 through a drive such as a chain 3.

The winder roll 2 rotates upon a stationary axis in the direction of the arrow to wind thereon a long or substantially continuous strip 4 of paper as it is delivered thereto from a printing press (not shown).

The motor 1 is driven by liquid supplied thereto from a positive displacement pump 5 which is driven in unison with the press as by means of a belt 6 and a pulley 7.

The pump 5 has its outlet connected to the inlet of the motor 1 by a discharge pipe 8 through which the pump delivers liquid to the motor to operate it, and the liquid discharged by the motor is returned to the pump through a return pipe 9.

A part of the liquid discharged by the pump is bypassed or diverted through a resistance consisting of an adjustable choke 10, which has its inlet connected to the discharge pipe 8, and a resistance valve 11 which has its inlet connected to the outlet of the choke 10 and its outlet connected to the return pipe 9.

The discharge pipe 8 is also connected to the return pipe 9 through a normally closed bypass valve 12 which may be opened, if desired, to bypass the entire output of the pump 5 and thereby prevent the motor from driving the winder roll.

Since the flow of liquid through a choke varies in accordance with the difference in pressure between its inlet and its outlet, and since the resistance of the valve 11 remains constant after being adjusted, the volume of liquid bypassed through the choke 10 and the resistance valve 11 will vary in accordance with variations in pump pressure which is limited by a high pressure relief valve 13 connected between the pipes 8 and 9.

The torque of the motor and the rate at which liquid is bypassed through the choke 10 and the resistance valve 11 are controlled by a choke 14 which is connected in series with the motor and may be connected either into the discharge pipe 8, as shown in Fig. 1, or into the return pipe 9 as shown at 47 in Fig. 2.

A choke which may be connected in series with the motor is shown in Fig. 3. This choke is internally threaded at one end for connection to one section of the pipe 8 or 9, externally threaded at its other end for connection to the other section of the pipe 8 or 9, and provided at one end with an orifice 15 to restrict the flow of liquid therethrough.

The resistance offered by an orifice to the flow of liquid therethrough is a function of the velocity of the liquid, and the orifice 15 is so proportioned that its resistance added to the resistance of the motor is sufficient to cause the diversion through the choke 10 and the resistance valve 11 of all liquid delivered by the pump in excess of the volume required to enable the motor to drive the winder roll at a peripheral speed equal to the speed at which the strip 4 is delivered by the press and to maintain a given tension upon the strip.

The choke 10, which is connected between the pipe 8 and the resistance valve 11, may be of the type shown in Figs. 6 and 7. As shown, the choke consists of a closed cylindrical casing 16 and a hollow cylindrical valve member 17 which is closely fitted in the casing 16 to rotate therein and has a port 18 formed in its side wall.

The inlet to the casing 16 is formed in the side wall thereof in the plane of the port 18 and connected to the pipe 8 by a channel 8'. The outlet from the casing 16 is formed in one end thereof and connected by a channel 11' to the inlet of the resistance valve 11.

The valve member 17 has one of its ends open, to provide communication between the port 18 and the outlet channel 11', and its other end provided with a stem 19 which extends through the end of casing 16 opposite outlet channel 11'. By turning the stem 19, the valve member 17 may be rotated to vary the area of the opening between the channel 8' and the interior of the valve member 17 to thereby vary the resistance of the choke.

When starting the apparatus, the motor 1 must have a high starting torque in order to overcome the static inertia and the friction of the movable parts. The flow of liquid through the motor gradually increases from zero and is at first so slow that the choke 14 offers substantially no resistance to the flow of liquid therethrough. Consequently, the pump may deliver liquid to the motor at high pressure to enable it to exert a high rotative force upon the winder roll.

After the winder roll has been started, it must rotate at a relatively high speed in order to wind up the strip as fast as it is delivered by the press, but only a low torque is required to maintain a given tension upon the strip.

The orifice 15, the choke 10, and the resistance valve 11 are so proportioned or adjusted that the resistance of the motor at the low torque and the resistance of the orifice 15 at the relatively high velocity of the liquid will cause the diversion through the choke 10 and the resistance valve 11 of all liquid delivered by the pump in excess of the volume required to drive the motor at the relatively high speed required to wind the strip upon the winder roll as fast as it is delivered thereto.

As the apparatus continues to operate, the roll of paper upon the winder roll gradually and continually increases in diameter and tends to wind up the strip at progressively faster rates, thereby requiring a progressively greater motor torque to maintain a uniform tension upon the strip 4.

This increase in torque causes a progressive rise in pump pressure with a resultant progressive increase in the rate at which liquid is bypassed through the choke 10 and the resistance valve 11, thereby progressively decelerating the motor in proportion to the increase in the diameter of the roll of paper upon the winder roll.

By varying the speed of the motor in proportion to the variation in torque, the invention provides a hydraulic transmission having a substantially constant power output.

The choke 14 will function in the same manner whether connected into the pipe 8 or the pipe 9 but, in practice, it is ordinarily connected into the pipe 8.

In order that the power output of the motor may be maintained substantially constant by decreasing the motor speed as the torque increases, it is essential that the sizes of the pump and motor, the area of the orifice 15 of the choke 14 and the resistances of the choke 10 and the resistance valve 11 be carefully selected or adjusted in accordance with the characteristics of the machine to which the transmission is to be applied.

For example, if the transmission is to be employed to drive the rewind roll of a printing press, the following information may be readily obtained:

(a) The minimum diameter of the roll, i. e. the diameter of the core upon which the paper is wound as it is delivered by the press.

(b) The maximum diameter of the rewound roll.

(c) The tension to be maintained on the paper.

(d) The speed at which the paper is delivered to the rewind roll.

(e) The torque which must be applied to start the roll in excess of the torque required to keep the roll running idle.

From this data, it is possible to determine the sizes of the pump and motor, the area of the orifice 15 and the resistances of the choke 10 and the resistance valve 11 by the use of formulas in which the following symbols are employed:

$D_1$—Minimum diameter of roll (inches)
$D_2$—Maximum diameter of roll (inches)
F —Tension to be maintained on paper (pounds)
V —Speed at which the paper is delivered to the rewind roll (feet per minute)
$T_s$—Excess motor torque required for starting
R —Ratio between motor speed and roll speed
$V_1$—Pump displacement (cubic inches)
$V_2$—Motor displacement (cubic inches)
$S_1$—Pump speed (R. P. M.)
$P_2$—Pressure drop across choke 14 (pounds per square inch)
K —Resistance of valve 11 (pounds per square inch)
A —Area of orifice in choke 10 (sq. in.)

The first step is to select a pump and a motor of sufficient power capacity to perform the work. Since the paper is delivered to the rewind roll at a constant speed and as a constant tension is to be maintained thereon, a constant amount of power is required to do useful work. However, as the diameter of the roll increases, liquid is bypassed through the choke 10 and the resistance valve 11 at an increasing rate, and this rate increases as a function of the increase in roll diameter. Therefore, the power capacity of the pump and motor must be sufficient to perform the amount of useful work multiplied by the ratio of the maximum and minimum roll diameter. That is, the motor selected must have a power capacity in excess of $$FV\frac{D_2}{D_1}$$

and a torque great enough to overcome the static inertia and friction of the movable parts of the rewind mechanism. To this result an efficiency factor must be added corresponding to the efficiency of the units themselves. As the power output of a pump or motor is determined by its speed, its displacement per revolution and its maximum pressure, these three factors are determined by the pumps and motors available.

In practice, the pump and motor selected ordinarily have the same displacement per revolution and the same rated maximum speed. The pump is ordinarily operated at the rated maximum speed but the motor is operated about 10 per cent slower when driving the rewind roll at the maximum roll speed. That is, the motor is connected to the rewind roll by a drive which ordinarily has such a ratio that the motor operates at approximately 90 per cent of the rated maximum speed when the diameter of the roll is the smallest.

The next step is to select a choke 14 having an orifice of the correct area and shape to cause a drop in pressure across the choke at least as great as the pressure required to produce the excess starting torque. The pressure drop required is determined from the formula $$P_2 = \frac{2\pi}{V_2}T_s.$$

After the pressure drop across the orifice is found, the area of the orifice may be readily calculated.

The next step is to determine the area of the orifice in the bypass choke 10 and the resistance of the resistance valve 11. This is accomplished by setting up the following simultaneous equations for the minimum and maximum roll diameters, substituting known values for the symbols and solving for K and A:

$$\frac{\pi F D_1}{R V_2} + P_2 = K + \frac{2.89 \times 10^{-8}}{A^2}\left(\frac{V_1 S_1 - 12 V_2 V R}{\pi D_1}\right)^2$$

$$\frac{\pi F D_2}{R V_2} + P_2 = K + \frac{2.89 \times 10^{-8}}{A^2}\left(\frac{V_1 S_1 - 12 V_2 V R}{\pi D_2}\right)^2$$

When the pump, motor, line choke, bypass choke and bypass resistance valve have been selected in the manner described, the motor will maintain an approximately constant tension upon the paper throughout the entire range of roll diameters. In practice, however, the bypass choke and the resistance valve are made adjustable in order that the tension may be varied to meet varying conditions.

*Fig. 2.*—The transmission shown in this figure is provided with a rotary hydraulic motor 20 for driving a printing press or the like, of which only the delivery roll 21 and the drive shaft 22 have been shown as the press per se forms no part of the present invention.

The motor 20 is connected to the press through intermeshing gears 23 and 24 fixed, respectively upon the motor shaft 25 and the drive shaft 22 which is connected to the roll 21 through bevel gears 26 and 27.

The press delivers paper in a substantially continuous strip 28 to a winder roll 29 which is driven by a rotary hydraulic motor 30 through a chain or other flexible drive 31.

The motors 20 and 30 are connected in series with each other and driven by liquid supplied thereto by a pump 32 which is driven by an electric motor 33.

The liquid delivered by the pump first passes through the motor 20 and then passes through the motor 30 so that the motors 20 and 30 are driven in unison.

When the delivery of liquid to the motor 20 is interrupted, either by stopping or bypassing the pump 32, the press tends to continue to run at gradually decreasing speeds for a considerable length of time due to the inertia of its moving parts.

In order to quickly stop the press, a control valve 34 is connected between the motors 20 and 30 to divert the liquid discharged from the motor 20 through a resistance valve 35 which resists the discharge of liquid from the motor 20 and causes it to function as a brake to quickly decelerate the press.

The pump 32 delivers its output into a branched discharge pipe 36 which has one of its branches connected to the inlet of the motor 20 and its other branch connected to an annular port 37 formed in the casing of the control valve 34.

The motor 20 discharges into a branched pipe 38 which has one of its branches connected to the inlet of the resistance valve 35 and its other branch connected to an annular port 39 formed in the casing of the valve 34.

The port 39 is normally open to an annular port 40 which is formed in the casing of the valve 34 and connected to the inlet of the motor 30 by a pipe 41 which is connected intermediate its ends to the outlet of the resistance valve 35 by a pipe 42.

The motor 30 has its outlet connected to the pump 32 by a return pipe 43, and a reversing valve 44 is ordinarily connected across the pipes 41 and 43 in order to permit the motor 30 to be reversed when and if desired.

An adjustable choke 45 and a resistance valve 46 are connected in series with each other between the pipes 41 and 43, and a choke 47 is connected in series with the motor 20 to control the power output of the winder motor as previously explained in connection with apparatus shown in Fig. 1, the choke 47 being shown connected into the return pipe 43.

The flow of liquid through the valve 34 is controlled by its plunger 48 which is permitted to reciprocate freely therein by connecting both ends of the valve casing to each other and to the return pipe 43 by a pipe 49 to permit liquid to flow from one end of the casing to the other end thereof or between either end and the return pipe.

The valve 34 is ordinarily remotely controlled, as by means of a solenoid 50 which is controlled from a remote point and has its core connected to the plunger 48 to move it to one position against the action of a spring 51 which is arranged in the valve casing and tends to move the plunger 48 to a different position.

When the pump is operating and the valve plunger 48 is in the position shown in full lines, the port 37 is blocked and all of the liquid discharged by the pump passes through the pipe 36 to the motor 20 and causes it to drive the press at a predetermined speed.

The liquid discharged by the motor 20 flows through the pipe 38 and the valve 34 to the pipe 41. A part of this liquid passes through the motor 30 to operate it and another part thereof is bypassed or diverted through the choke 45 and the resistance valve 46 to the return pipe 43.

The volume of liquid bypassed depends upon the torque of the motor 30 since the chokes 45 and 47 and the resistance valve 46 are the same, respectively, as the chokes 10 and 14 and the resistance valve 11 and function in the same manner.

The winder roll is thus driven at the exact speed necessary to wind up the strip 28 as it is delivered thereto by the press and the motor 30 exerts a rotative force upon the winder roll which is just sufficient to maintain a predetermined tension upon the strip 28, as previously explained in connection with the description of the apparatus shown in Fig. 1.

When the plunger 48 is moved to the position shown in dotted lines, it blocks communication between the ports 39 and 40 and opens the port 37 to the pipe 49.

The liquid discharged by the pump then flows through the pipe 36, the valve 34, the pipe 49 and returns to the pump through the return pipe 43. The motor then tends to stop but the press continues to run, due to the inertia of its moving parts, and drives the motor 20 which functions as a pump and draws liquid into its cylinders from the pipe 36 and exhausts it into the pipe 38.

Since the port 39 is closed to the port 40 by the plunger 48, the liquid discharged by the motor 20 must pass through the resistance valve 35 which resists the discharge of liquid from the motor 20 and thereby causes the motor to act as a brake to gradually decelerate the press and quickly bring it to a stop.

The liquid exhausted through the resistance valve 35 flows through the pipes 42 and 41 to the motor 30 which is thereby enabled to drive the winder roll 29 until the press comes to rest.

*Figs. 4 and 5.*—The transmission shown in these figures is similar to the transmission shown in Fig. 1 except that it is provided with a variable displacement rotary hydraulic motor 61 instead of a constant speed motor in order to obtain a wider range in both the speed and the torque of the motor.

The motor 61 drives the winder roll 62 through a chain or other drive 63 to wind thereon a strip 64 of paper as it is delivered thereto from a printing press (not shown).

Liquid for driving the motor 61 is supplied by a pump 65 which delivers liquid at a rate proportional to the speed of the printing press and which is either driven in unison with the press, as shown in Fig. 1, or drives the press through a hydraulic motor connected in series with the winder roll motor, as shown in Fig. 2. As shown, the pump 65 is driven from the press through a belt 66 and a pulley 67.

The pump 65 delivers liquid to the motor 61 through a discharge pipe 68 and has liquid returned to it from the motor through a return pipe 69, a choke 70 being connected in series with the motor 61 and shown as being connected into the pipe 69. The choke 70 performs the same function and is of the same type as the choke 14 previously described.

The motor 61 has its stroke changing members urged toward minimum stroke position by a spring 71 and toward full stroke position by a piston 72 which is connected thereto and fitted in a cylinder 73.

The delivery of liquid to the cylinder 73 is controlled by a valve 74 which has two pistons 75 and 76 formed thereon and closely fitted for reciprocation within a bore 77 formed in a valve casing 78.

The valve 74 is urged toward the closed position by a spring 79 which is arranged within the bore 77 and has its tension adjusted by a screw 80.

The valve casing 78 is provided with a resistance valve 81 which is arranged therein alongside the bore 77, two annular ports or grooves 82 and 83 which are formed in the wall of the bore 77 and spaced from each other, a duct 84 which connects groove 82 to the bore 77 near the end thereof and beyond the piston 76, and a duct 85 which connects the groove 83 to the inlet of the resistance valve 81 the outlet of which is connected to the return pipe 69 by a pipe 86.

The groove 83 is connected to the stroke changing cylinder 73 by a pipe 87, and the groove 82 is connected to the discharge pipe 68 by a pipe 88 which has a choke 89 connected therein. The choke 89 performs the same function and is ordinarily of the same type as choke 10 previously described and shown in detail in Figs. 6 and 7.

When starting the apparatus, the motor 61 must have a high starting torque in order to overcome the static inertia and the friction of the movable parts. After starting, the torque at first decreases and then gradually increases as the roll of paper wound upon the winder roll 62 increases in diameter.

Since the spring 79 holds the valve 74 in closed position when the apparatus is idle, the pump 65 tends to deliver its entire output to the motor 61 which at this time is held at minimum stroke by the spring 71 and, since the resistance offered by an orifice to the flow of liquid therethrough varies in accordance with the velocity of the liquid, the choke 70 offers no resistance to the starting of the motor for the reason that the liquid flow is zero until the motor starts. Therefore, the full pump pressure is available for starting the motor.

The pressure created by the pump extends through the choke 89, the pipe 88, the groove 82 and the duct 84 to the bore 77 and acts upon the end of the piston 76 and, if the motor does not start until sufficient pressure has been created to overcome the resistance of the spring 79, the valve 74 is opened and liquid flows from the groove 82 through the bore 77, the groove 83 and the pipe 87 to the cylinder 73 and moves the piston 72 against the resistance of the spring 71 to increase the stroke of the motor and thereby increase the motor torque until it is sufficient to start the winder roll.

After the winder roll has been started, less motor torque is required to keep it rotating. Consequently, the pressure drops and, if the winder roll has but few turns of paper thereon, the valve 74 closes so that the entire output of the pump is delivered to the motor to drive it at a speed proportional to the speed of the pump. That is, the speed of the motor increases as the speed of the pump increases due to the increase in the speed of the printing press.

As the speed of the pump increases, the velocity of the liquid increases and causes the resistance offered by the choke 70 to increase and decrease the torque of the motor 61 as the motor speed increases, thereby maintaining the power output of the motor 61 substantially constant.

As the paper accumulates upon the winder roll, the strip 64 offers gradually increasing resistance to the rotation of the winder roll and this increasing resistance added to the resistance of the choke 70 causes the pump to increase the pressure of the driving liquid.

This increased pressure, acting upon the piston 76, is sufficient to overcome the resistance of the spring 79 and move the valve 74 far enough to allow a small volume of liquid to flow to the cylinder 73 and increase the stroke of the motor 61 in proportion to the increase in pressure.

Increasing the stroke of the motor at this rate increases the torque of the motor in proportion to the increase in the resistance offered by the strip 64, thereby keeping the tension on the strip 64 substantially constant, and the increase in the motor stroke decreases the motor speed in proportion to the increase in the diameter of the roll of paper on the winder roll, thereby keeping the peripheral speed of the roll of paper constant and at all times equal to the linear speed of the strip 64.

The piston 75 on the valve 74 coacts with the edge of the groove 83 to throttle and control the flow of liquid to the stroke changing cylinder 73.

As the diameter of the roll of paper on the winder roll gradually increases with the resultant gradual increase in pump pressure, the valve 74 floats between a closed and a slightly open position and permits only small volumes of liquid to flow to the cylinder 73 until the piston 72 has gradually adjusted the motor to full stroke at which time the pressure is high enough to fully open the valve 74.

Instead of throttling the liquid between the piston 75 and the edge of the groove 83, the liquid may be delivered freely to the cylinder 73 and the spring 71 be so proportioned as to resistance and length that the liquid in the cylinder 73 will change the stroke of the motor at the correct rate.

After the motor is at full stroke and the valve 74 is fully open, the transmission functions in the same manner as the transmission shown in Fig. 1. That is, the pump delivers its entire output to the motor momentarily and then the increase in the diameter of the roll of paper on the winder roll causes the pump pressure to rise sufficiently to open the resistance valve 81 after which a part of the pump output is diverted or bypassed through the choke 89, the pipe 88, the bore 77, the duct 85, the resistance valve 81 and the pipe 86 to the return pipe 69.

As the roll of paper on the winder roll gradually increases in diameter, the pressure created by the pump gradually increases with the result that a gradually increasing volume of liquid is bypassed and a proportionately smaller volume of liquid passed through the motor so that the speed of the motor gradually decreases while its torque increases due to the increase in pressure.

The motor speed is thus gradually decreased and the motor torque proportionately increased first by changing motor displacement and later by varying the volume of liquid passed through the motor whereby the motor has a substantially constant power output throughout its entire range of operating speeds.

If the motor should stall or become overloaded and thereby cause the pump pressure to rise above a predetermined maximum, the pump will discharge through a relief valve 90 which is connected between the discharge pipe 68 and the pipe 86.

The transmissions herein described are susceptible of various modifications and adaptations without departing from the scope of the invention as hereafter claimed.

The invention is hereby claimed as follows:

1. A hydraulic transmission, comprising a rotary hydraulic motor for carrying a constant load at varying speeds, a pump for supplying liquid to said motor to drive the same, and means for varying the torque of said motor inversely to variations in the speed of said motor.

2. A hydraulic transmission, comprising a rotary hydraulic motor for carrying a constant load at varying speeds, a pump for supplying liquid to said motor to drive the same, and means responsive to variations in the velocity of the liquid flowing through said motor for varying the torque of said motor to obtain a substantially constant power output from said motor.

3. A hydraulic transmission, comprising a rotary hydraulic motor for carrying a constant load at varying speeds, a pump for supplying liquid to said motor to drive the same, and means for varying the torque of said motor inversely to variations in the speed of said motor; said means including an orifice choke connected in series with said motor and means for diverting from said motor a part of the liquid delivered by said pump and responsive to variations in pump pressure for varying the rate at which said liquid is diverted.

4. A hydraulic transmission, comprising a rotary hydraulic motor for carrying a constant load at varying speeds, a pump for supplying liquid to said motor to drive the same, a resistance connected between said pump and said motor for diverting from said motor a part of the liquid delivered by said pump and responsive to variations in pump pressure for varying the rate at which said liquid is diverted, and means responsive to variations in the velocity of the liquid passing through said motor for varying the torque of said motor inversely to said variations in velocity and for varying pump pressure to thereby vary the rate at which liquid is diverted from said motor.

5. A hydraulic transmission, comprising a rotary hydraulic motor for carrying a constant load at varying speeds, a pump for supplying liquid to said motor to drive the same, a resistance connected between said pump and said motor for diverting from said motor a part of the liquid delivered by said pump and responsive to variations in pump pressure for varying the rate at which said liquid is diverted, and an orifice choke connected in series with said motor for varying the torque of said motor inversely to said variations in velocity and for varying pump pressure to thereby vary the rate at which liquid is diverted from said motor.

6. A hydraulic transmission, comprising a rotary hydraulic motor for carrying a constant load at varying speeds, a pump for supplying liquid to said motor to drive the same, an adjustable choke having its inlet connected between said pump and said motor for diverting from said motor a part of the liquid delivered by said pump, and means responsive to variations in the velocity of the liquid passing through said motor for varying the torque of said motor inversely to said variations in velocity and for varying pump pressure to thereby vary the rate at which liquid is diverted through said choke.

7. A hydraulic transmission, comprising a rotary hydraulic motor for carrying a constant load at varying speeds, a pump for supplying liquid to said motor to drive the same, an adjustable choke having its inlet connected between said pump and said motor for diverting from said motor a part of the liquid delivered by said pump, and an orifice choke connected in series with said motor for varying the torque of said motor inversely to said variations in velocity and for varying pump pressure to thereby vary the rate at which liquid is diverted through said adjustable choke.

8. A hydraulic transmission, comprising a rotary hydraulic motor for carrying a constant load at varying speeds, a pump for supplying liquid to said motor to drive the same, an adjustable choke having its inlet connected between said pump and said motor for diverting from said motor a part of the liquid delivered by said pump, a resistance valve connected in series with said choke, and means responsive to variations in the velocity of the liquid passing through said motor for varying the torque of said motor inversely to said variations in velocity and for varying pump pressure to thereby vary the rate at which liquid is diverted from said motor.

9. A hydraulic transmission, comprising a rotary hydraulic motor for carrying a constant load at varying speeds, a pump for supplying liquid to said motor to drive the same, an adjustable choke having its inlet connected between said pump and said motor for diverting from said motor a part of the liquid delivered by said pump, a resistance valve connected in series with said choke, and an orifice choke connected in series with said motor for varying the torque of said motor inversely to said variations in velocity and for varying pump pressure to thereby vary the rate at which liquid is diverted from said motor.

10. A hydraulic transmission, comprising a rotary hydraulic motor for carrying a constant load, a pump for supplying liquid to said motor to drive the same and having a volumetric delivery in excess of motor requirements, fluid channels connecting said pump to said motor for the delivery of liquid from said pump to said motor and the return of liquid therefrom, a choke and a resistance valve connected in series with each other between said channels for bypassing a part of the liquid delivered by said pump, and an orifice choke connected in series with said motor for varying pump pressure to thereby vary the volumetric rate of said bypassed liquid with a resultant variation in motor speed and for varying the torque of said motor inversely to variations in motor speed.

11. A hydraulic transmission, comprising a variable displacement rotary motor, a pump for supplying motive liquid to said motor to operate the same, an orifice choke connected in series with said motor, and means responsive to variations in the drop in pressure across said choke and motor for varying the displacement of said motor inversely to variations in the pressure of said liquid to thereby vary the torque and the speed of said motor inversely to each other.

12. A hydraulic transmission, comprising a variable displacement rotary motor, hydraulically actuated means for varying the stroke of said motor inversely to variations in the pressure prevailing within said means, a pump for supplying motive liquid to said motor to operate the same, and a hydraulically actuated valve responsive to variations in pump pressure for controlling the delivery of liquid from said pump to said means to cause the same to vary motor displacement inversely to pump pressure and thereby vary the torque and the speed of said motor inversely to each other.

13. A hydraulic transmission, comprising a variable displacement rotary motor, hydraulically actuated means for varying the stroke of said motor inversely to variations in the pressure prevailing within said means, a pump for supplying motive liquid to said motor to operate the same, a hydraulically actuated valve responsive to variations in pump pressure for controlling the delivery of liquid from said pump to said means to cause the same to vary motor displacement inversely to pump pressure and thereby vary the torque and the speed of said motor inversely to each other, and a choke connected between said valve and said pump.

14. A hydraulic transmission, comprising a variable displacement rotary motor, a pump for supplying motive liquid to said motor to operate the same, pressure responsive means for varying the displacement of said motor inversely to variations in the pressure of said liquid to thereby vary the torque and the speed of said motor inversely to each other, and means responsive to variations in pump pressure for bypassing a part of the output of said pump and for varying the volume of bypassed liquid to thereby further vary the speed and the torque of said motor inversely to each other.

15. A hydraulic transmission, comprising a variable displacement rotary motor, hydraulically actuated means for varying the stroke of said motor inversely to variations in the pressure prevailing within said means, a pump for supplying motive liquid to said motor to operate the same, a hydraulically actuated valve responsive to variations in pump pressure for controlling the delivery of liquid from said pump to said means to cause the same to vary motor displacement inversely to pump pressure and thereby vary the torque and the speed of said motor inversely to each other, and means responsive to variations in pump pressure for bypassing a part of the output of said pump and for varying the rate at which said liquid is bypassed to thereby further vary the speed and the torque of said motor inversely to each other.

16. A hydraulic transmission, comprising a variable displacement rotary motor, hydraulically actuated means for varying the stroke of said motor inversely to variations in the pressure prevailing within said means, a pump for supplying motive liquid to said motor to operate the same, a hydraulically actuated valve responsive to variations in pump pressure for controlling the delivery of liquid from said pump to said means to cause the same to vary motor displacement inversely to pump pressure and thereby vary the torque and the speed of said motor inversely to each other, a choke connected between said valve and said pump, and means responsive to variations in pump pressure for bypassing a part of the output of said pump and for varying the rate at which said liquid is bypassed to thereby further vary the speed and the torque of said motor inversely to each other.

17. The combination, with a machine, of a rotary hydraulic motor connected to said machine for driving the same, a second hydraulic motor connected in series with said driving motor, a pump for delivering liquid to said motors to drive the same, means connected between said motors for controlling the rate of delivery of liquid to said second motor to cause it to have a substantially constant power output, means for interrupting the delivery of liquid to said driving motor, and means for causing said driving motor to act as a brake to stop said machine.

18. The combination, with a machine, of a rotary hydraulic motor connected to said machine for driving the same, a second hydraulic motor connected in series with said driving motor, a pump for delivering liquid to said motors to drive the same, means responsive to variations in liquid flow for controlling the rate of delivery of liquid to said second motor to cause it to have a substantially constant power output, a resistance valve, and means for interrupting the delivery of liquid to said driving motor and for directing the liquid discharged from said driving motor through said resistance valve to thereby cause said driving motor to act as a brake upon said machine.

19. The combination, with a machine, of a rotary hydraulic motor connected to said machine for driving the same, a second hydraulic motor, a pump for delivering liquid to said motors to drive the same, means controlling the rate of delivery of liquid to said second motor to cause it to have a substantially constant power output, means for interrupting the delivery of liquid to said driving motor, a resistance valve having its outlet connected to the inlet of said second motor, and means for directing the liquid discharged from said driving motor through said resistance valve to thereby cause said driving motor to act as a brake upon said machine.

20. The combination, with a machine, of a rotary hydraulic motor connected to said machine for driving the same, a second hydraulic motor connected in series with said driving motor, a pump for delivering liquid to said motors to drive the same, means connected between said motors for controlling the rate of delivery of liquid to said second motor to cause it to have a substantially constant power output, a resistance valve, and a control valve for bypassing the output of said pump and for directing the discharge from said driving motor through said resistance valve to cause said driving motor to act as a brake upon said machine.

RANSOM TYLER.